Dec. 20, 1966  I. S. BLONDER  3,293,588

ELECTRICAL OUTLET LOCKING COVER

Filed Dec. 21, 1964

Inventor
Isaac S. Blonder
by Rines and Rines
Attorneys

United States Patent Office 3,293,588
Patented Dec. 20, 1966

3,293,588
ELECTRICAL OUTLET LOCKING COVER
Isaac S. Blonder, West Orange, N.J., assignor to Blonder-Tongue Electronics, Newark, N.J., a corporation of New Jersey
Filed Dec. 21, 1964, Ser. No. 419,963
2 Claims. (Cl. 339—37)

The present invention relates to electrical outlet locking covers and, more particularly, to covers for television, sound or similar electrical outlets that enable not only complete covering of the outlet, or access to the outlet for applying and withdrawing electrical connectors thereto and therefrom at will, but partial covering of a connected electrical connector to prevent its disconnection from the outlet, as well.

In my prior United States Letters Patent No. 3,131,985, issued May 5, 1964, for Electrical Outlet Attachment, a most satisfactory cover for an electrical outlet is described that is useful in hotels, motels, schools and other areas where control of access to and protection of electrical outlets are required. There are some instances, however, as in the case of schools and the like, where greater versatility in locked coverings is necessary, it being essential not merely to cover and uncover access to the electrical outlet, but to prevent external disconnection of a connected electrical connector, as well. In summary, it is to the solution of this problem, in a simply operated and inexpensive structure that the present invention is accordingly directed.

A further object of the invention is to provide a novel outlet cover of more general utility, as well.

Other and further objects will be hereinafter pointed out and will be more particularly delineated in the appended claims.

Figure 1:
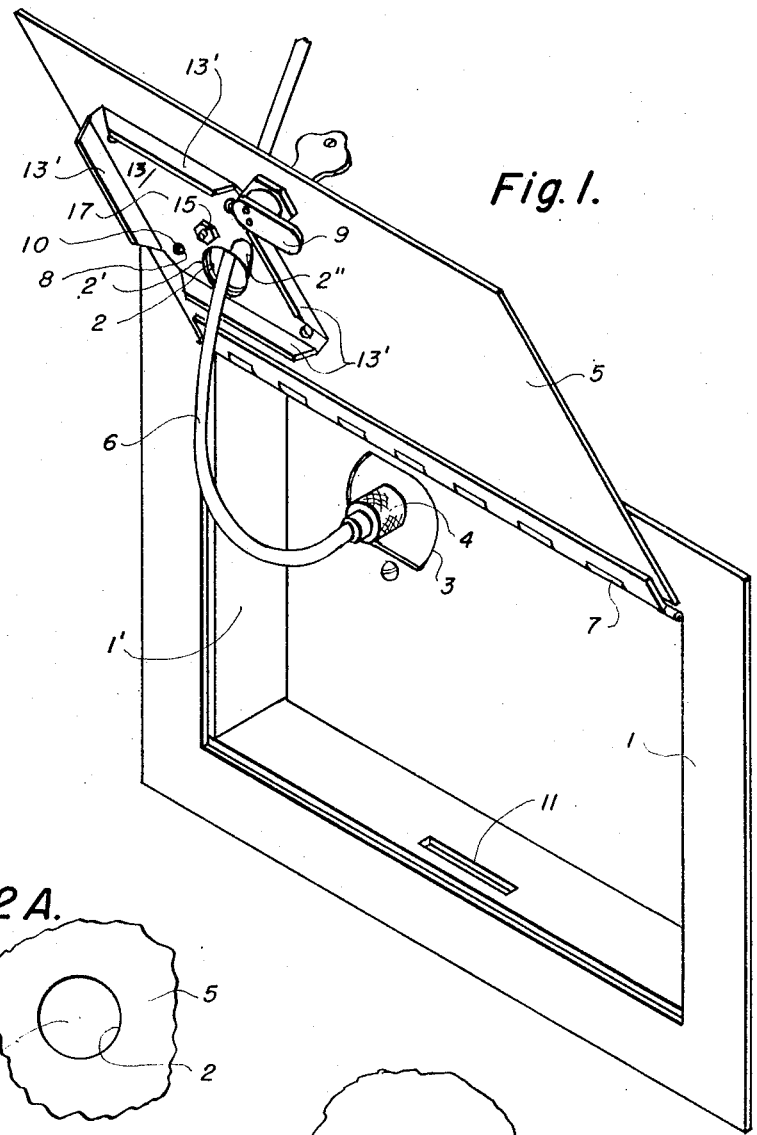
Figure 2A:
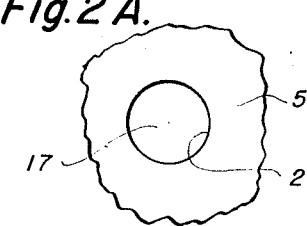
Figure 2C:
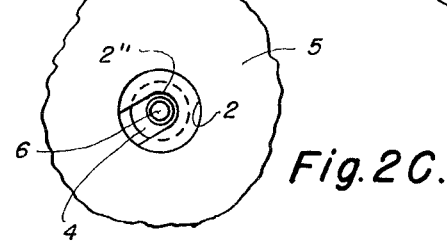
Figure 2B:
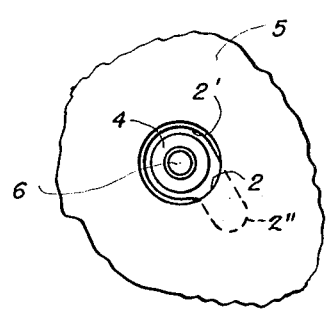

The invention will now be more fully described in connection with the accompanying drawings, FIG. 1 of which is an isometric view of a preferred embodiment thereof; and FIGS. 2A, 2B and 2C are partial front elevational views, on a somewhat enlarged scale, illustrating successive positions of adjustment of the locking cover mechanism.

Referring to FIG. 1, a recessed electrical outlet box and the like is shown at 1 having outlets, such as the outlet 3, disposed in the rear wall thereof, the box being mountable, for example, within the wall or other surface structure of a room. A lockable front plate cover 5 is hingedly connected at 7 to close off the outlet box 1 and, through cooperation of a latch 9 and locking slot 11, to prevent access to or tampering with the outlets, as well as protecting the same from dust, dirt and moisture.

In accordance with the invention, a further plate 13 is pivotally secured, as at its central region 15, adjacent and against the rear surface of the cover plate 5 behind an aperture 2 in the front cover plate 5 that permits access from the front to the outlet 3. In one quadrant of the plate 13, an aperture 2' is provided, preferably of substantially the same dimensions as the front cover plate aperture 2, that in the position of orientation illustrated in FIGS. 1 and 2B, is alined with the aperture 2 and enables insertion or withdrawal of an electrical connector 4 with its attendant cable or leads 6 to establish electrical connection with the outlet 3 or to disconnect therefrom, respectively. Simple rotation or pivoting of the plate 13 through one hundred eighty degrees about the region 15 will bring an opposite quadrant solid portion 17 of the plate 13 behind the front cover aperture 2, completely blocking the same and preventing any access to the outlet 3, as shown in FIG. 2A.

The aperture 2' in the plate 13 opens into and is contiguous with an elongated aperture extension 2" extending into the quadrant between the portions 2' and 17 of the plate 13 and of cross dimension less than that of the aperture 2 and the electrical connector 4 but greater than the cross dimension of the cable 6. With the plate 13 oriented to this intermediate quadrant position, FIG. 2C, the connector 4 cannot be tampered with from the outside.

Through the use of recesses or apertures 8 in the corners of the plate 13 and cooperative detents or dimples 10 in the rear surface of the front cover plate 5, the plate 13 may be readily locked in each of the described quadrant positions of orientation, the resilient action of the pivoted plate 13 enabling ready unlocking of the detent-recess engagement and rotation to assume successive positions for the functions shown in FIGS. 2A, 2B and 2C. Further to aid in locking and the holding of proper orientation during closing of the cover 5, the plate 13 is preferably provided with depending flanges 13' that become alined with the recessed wall 1' of the outlet box 1 to lock the position of the plate 13.

Other geometric configurations of the multiple-function plate 13 may also clearly be employed as may other types of position-locking means and differently shaped apertures, all such, and further modifications occurring to those skilled in the art, being within the scope of the invention as defined in the appended claims. Multiple plates 13 for multiple outlets 3 may, of course, also be employed.

What is claimed is:
1. A locking cover for an electrical outlet and the like having a front plate apertured to receive an electrical connector for connection to such outlet together with adjacent cable therefor; a further plate pivotally secured against the rear surface of the front plate so as to enable orientation in different positions rearward of the front plate aperture; the further plate having a solid portion that in one of such different positions of orientation completely blocks the said aperture to prevent access to the outlet, a first apertured portion that in another of such different positions of orientation becomes alined with the said front plate aperture to permit insertion and withdrawal of a connector and cable, a second apertured portion contiguous with the first apertured portion and of cross-dimension less than that of the first apertured portion and that of the connector but greater than that of the cable that in still another position of orientation prevents withdrawal of the connector from the outlet; means for locking the further plate in each of its said positions of orientation, and a recess containing the outlet rearward of the locking cover, the said locking means comprising flange means extending from the further plate for engaging wall portions of the said recess.
2. A locking cover as claimed in claim 1 and in which the said solid portion of the further plate occupies one quadrant thereof, the said first apertured portion an oppositely disposed quadrant, and the contiguous second apertured portion a quadrant therebetween.

References Cited by the Examiner
UNITED STATES PATENTS
1,228,627 6/1917 Winans _____ 24—211
2,487,900 11/1949 Sopher _____ 174—67

EDWARD C. ALLEN, Primary Examiner.

J. H. McGLYNN, Assistant Examiner.